J. C. JEWETT.
Combined Water Cooler and Filter.
No. 208,909.  Patented Oct. 15, 1878.
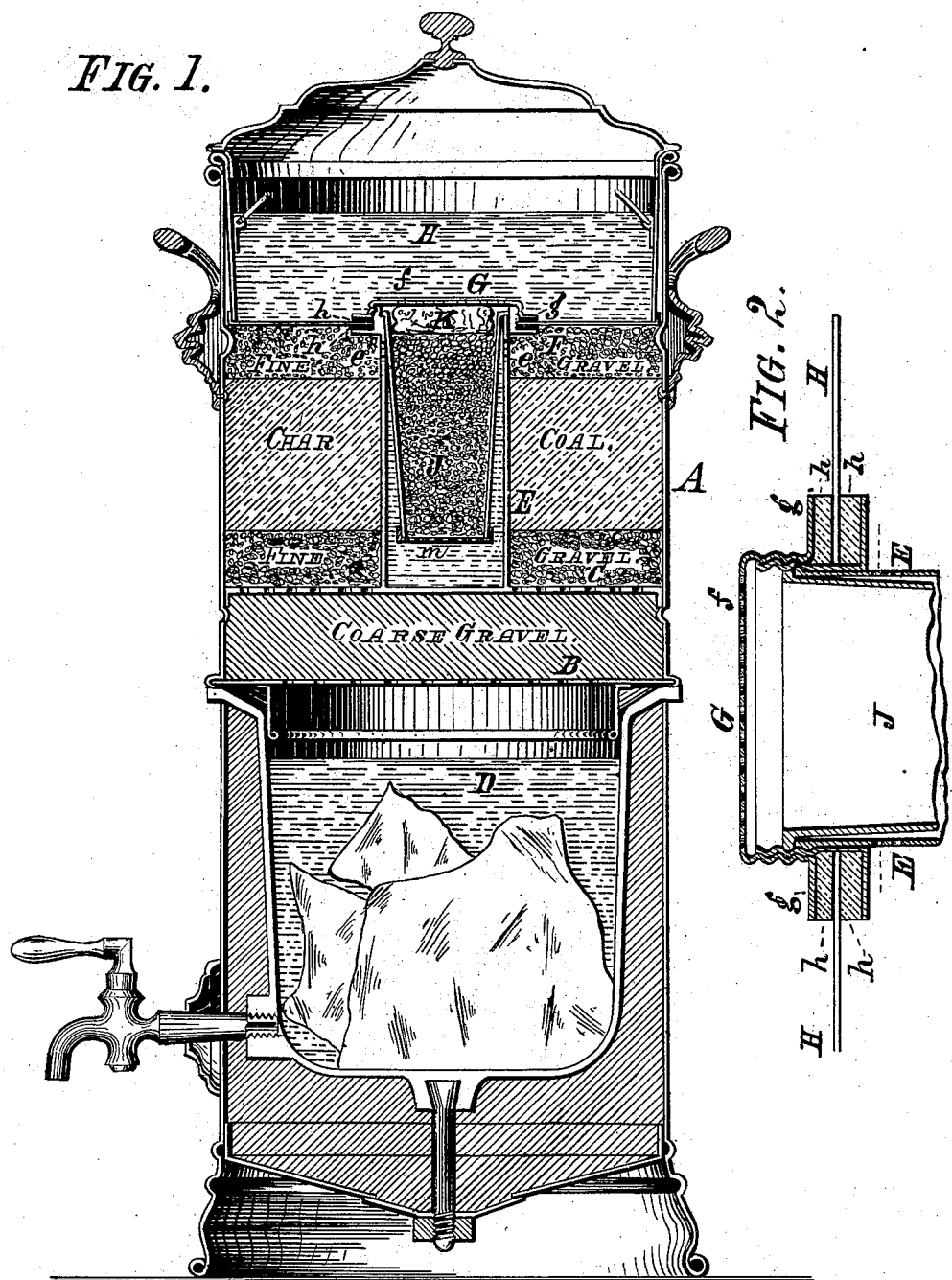

United States Patent Office.

JOHN C. JEWETT, OF BUFFALO, NEW YORK.

IMPROVEMENT IN COMBINED WATER COOLER AND FILTER.

Specification forming part of Letters Patent No. 208,909, dated October 15, 1878; application filed August 16, 1878.

*To all whom it may concern:*

Be it known that I, JOHN C. JEWETT, of Buffalo, in the county of Erie and State of New York, have invented certain new and useful Improvements on a Combined Water Cooler and Filter; and I do hereby declare that the following description of my said invention, taken in connection with the accompanying sheet of drawings, forms a full, clear, and exact specification, which will enable others skilled in the art to which it appertains to make and use the same.

This invention has special reference to a combined water cooler and filter; and it consists in the peculiar arrangement of parts and details of construction, as hereinafter first fully set forth and described, and then pointed out in the claims.

In the drawings heretofore mentioned, Figure 1 is a longitudinal sectional elevation of my improved cooler and filter. Fig. 2 is a similar view, representing the screw-cap arrangement of the vessel E on a larger scale.

The object of my present invention is the production of a filter, to be used in connection with a water-cooler, &c., which shall be capable of being readily taken apart to remove and clean the filtering-bed.

In the filter and cooler for which Letters Patent of the United States No. 96,923 were granted to me on the 16th day of November, 1869, I have shown a filter having a removable filtering-cup inserted into a vessel embedded in a permanent filtering-bed, said vessel being fixed to a division-plate on the top surface of said filtering-bed. This construction did not admit of a ready removal and cleaning or renewal of said filtering-bed, and therefore compelled the owner of the filter to send the same to the manufacturer, thus often causing vexatious delays and heavy expenses for transportation.

To avoid these objections, I construct my filtering-vessel A with a perforated bottom, B, and at a proper distance above that with a perforated diaphragm, C, the space between these two diaphragms being filled with coarse gravel, forming a permanent filtering-bed, which, being, as hereinafter to be referred to, the last stratum through which the water passes previous to entering the cooling-chamber D, which does not require removal. Centrally upon the diaphragm C, I secure a cylindrical vessel, E, near the upper end of which I provide a projecting flange, F. The upper extremity of this vessel is externally screw-threaded to receive a screw-cap, G, having perforations $f$, to allow the passage of the liquid from the reservoir H to the filtering strata. This reservoir H, which has in its bottom a circular aperture fitting the exterior of the vessel E, is placed over said vessel E, and removably secured thereto by said cap G, which, when screwed down upon the said vessel E, clamps the bottom of the reservoir between the flange F and the flange $g$ on the cap G, rubber or similar packing-rings $h$ $h$ being interposed between the said flanges and the bottom of the reservoir H to make a tight joint. Within the vessel E, I place a filtering-cup, J, having a perforated bottom, $m$, said filtering-cup being supplied with fine gravel and a sponge, K, as clearly shown in the figure. The vessel E has a series of apertures, $e$, near its junction with the bottom of the reservoir H, through which the water passes from said filtering-cup E to the strata of filtering material in the filter A. The uppermost layer of this material consists of fine gravel, and the intermediate stratum of prepared charcoal, while the substratum consists of fine gravel, the proportions of the substances being about one of fine gravel to three of prepared charcoal.

In operation, the water, entering the filtering-cup J through the perforated cap G, passes first through the sponge K and the gravel in said cup, depositing the coarser and grosser particles and impurities in said sponge and gravel. These materials require frequent removal and cleaning, which can readily be accomplished by unscrewing the cap G, when the vessel J and its contents can be lifted out of the permanent vessel E. In this vessel the water accumulates, and, rising, flows through the apertures $e$ into the filtering-bed, as heretofore described.

It will be readily observed that, should the strata of gravel and charcoal in the filter A become foul from extended use, the cap G can be unscrewed and the reservoir H removed from the filtering-vessel A, when free access can be had to the layers of filtering material, the same removed and cleaned, and finally repacked in a very short space of time, said manipulation being readily accomplished by any intelligent person.

The permanent layer of gravel inclosed between the fixed diaphragms B and C does not require removal, it being the last stratum through which the water passes on its way to the cooler, and hence but little liable to contain foreign matter. It may, however, be readily cleansed by passing a stream of water through it after removing the upper strata.

By constructing the filter as above described I derive, in addition to the advantages already stated, the further one of compactness, and that the filter may be turned upside down without displacing the filtering material, which, in shipping, is quite an advantage.

Having thus fully described my invention, I claim as new and desire to secure to me by Letters Patent of the United States—

1. A filter in which the water is contained in a separate vessel, H, removably attached to the filter A by means of the central tube, E, having the flange F, and its upper extremity screw-threaded, and the cap G, with the flange $g$, packing-rings $h$ being interposed between the said flanges and the bottom of the reservoir A, substantially as and for the purpose stated.

2. The filter hereinbefore described, consisting, essentially, of the vessel A, having the two perforated diaphragms B C and an interposed layer of gravel, the central tube, E, secured to the diaphragm C and provided with the flange F and screw-threaded end, the filtering-cup J, with the gravel and sponge K, the vessel H, and the cap G, the whole being constructed and arranged for operation substantially as and for the purpose specified.

In testimony that I claim the foregoing as my invention I have hereto set my hand and affixed my seal in the presence of two subscribing witnesses.

JNO. C. JEWETT. [L. S.]

Attest:
MICHAEL J. STARK,
FRANK HIRSCH.